March 8, 1927. 1,620,154
E. C. FURMAN
METHOD AND APPARATUS FOR REPAIRING FLUID CONTAINERS
Filed Aug. 6, 1925   5 Sheets-Sheet 1
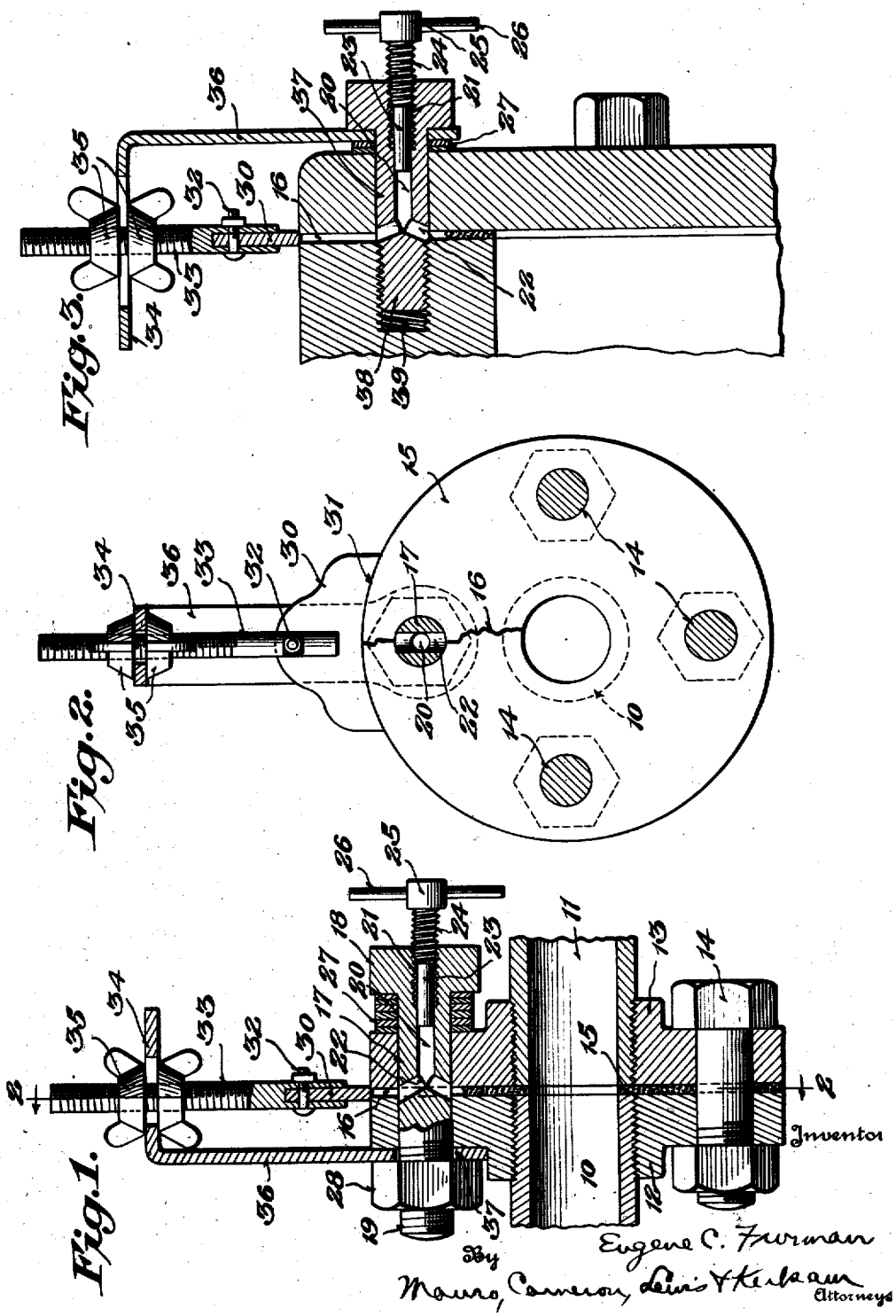

March 8, 1927. 1,620,154
E. C. FURMAN
METHOD AND APPARATUS FOR REPAIRING FLUID CONTAINERS
Filed Aug. 6, 1925 5 Sheets-Sheet 2

Inventor
Eugene C. Furman
By Mauro, Cameron, Lewis & Kerkam
Attorneys

March 8, 1927.  E. C. FURMAN  1,620,154
METHOD AND APPARATUS FOR REPAIRING FLUID CONTAINERS
Filed Aug. 6, 1925   5 Sheets-Sheet 3
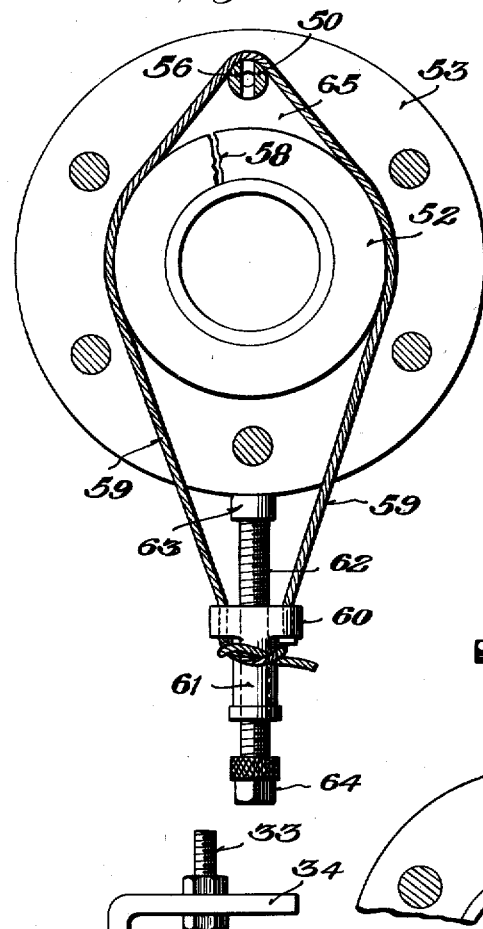
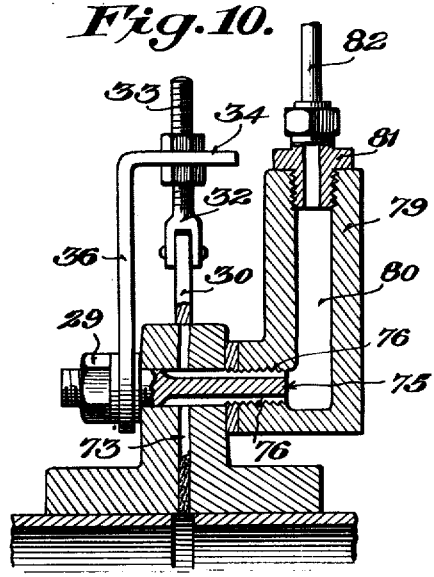
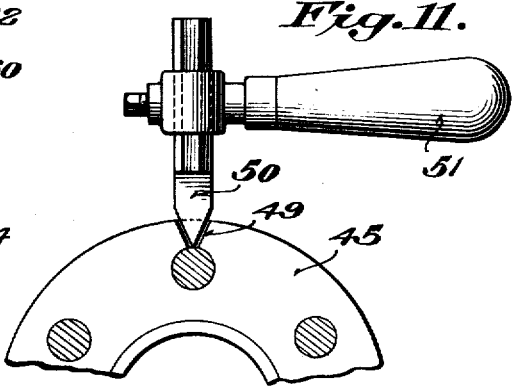
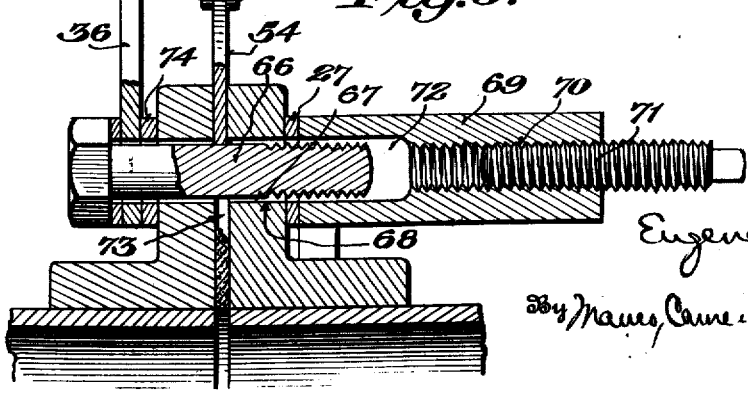
Inventor
Eugene C. Furman
By Mauey, Cameron, Lewis & Kerkam
Attorneys March 8, 1927.    E. C. FURMAN    1,620,154
METHOD AND APPARATUS FOR REPAIRING FLUID CONTAINERS
Filed Aug. 6, 1925    5 Sheets-Sheet 4
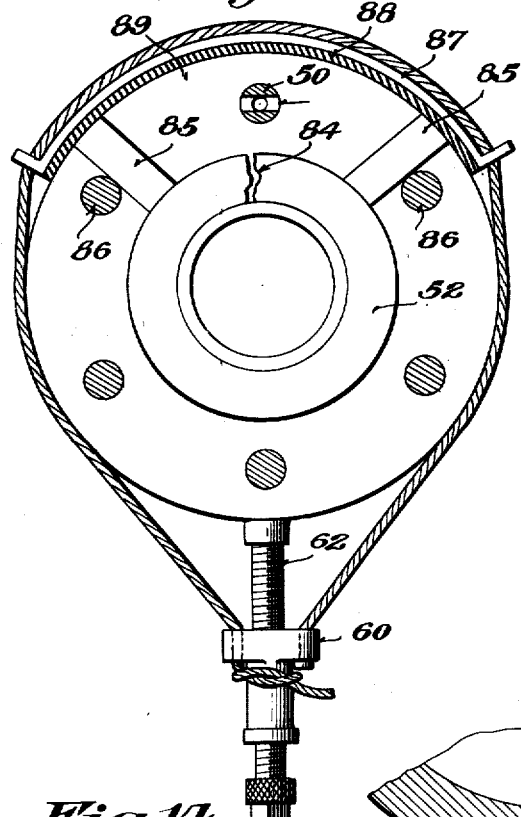
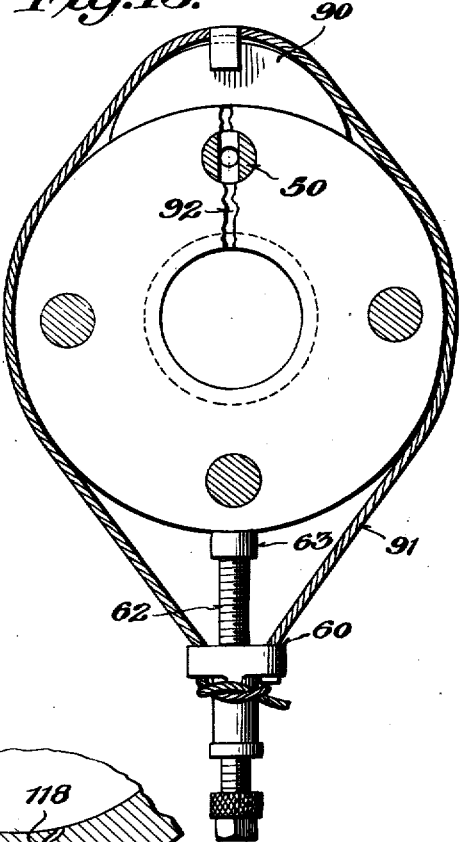
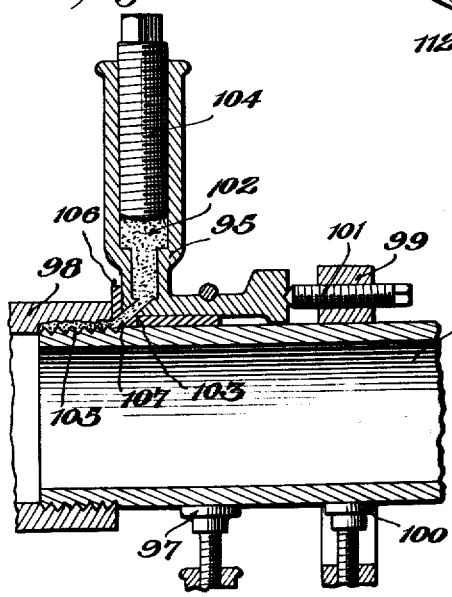
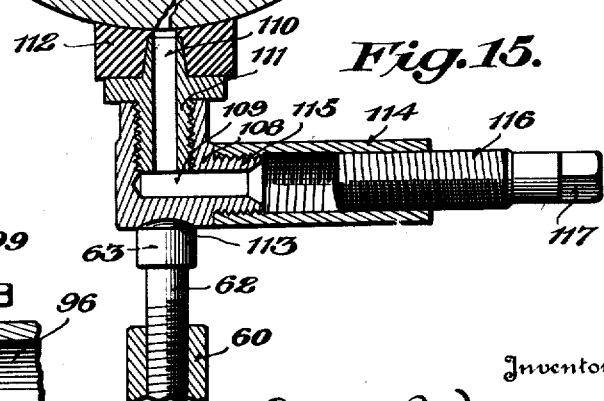

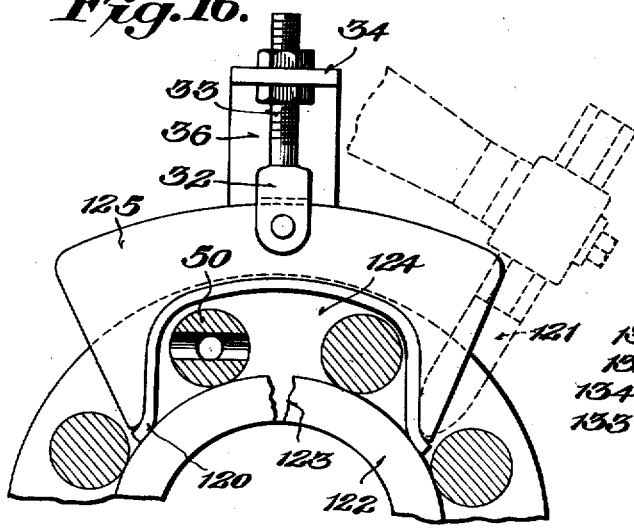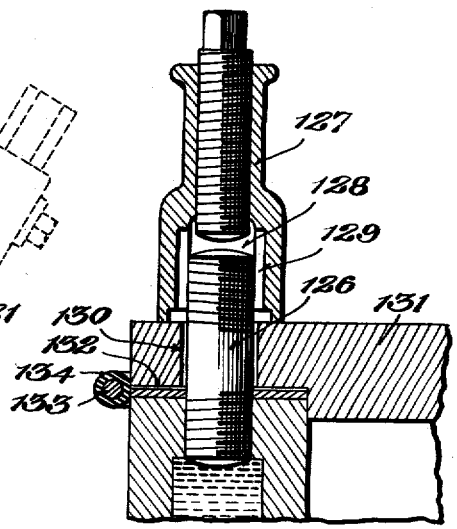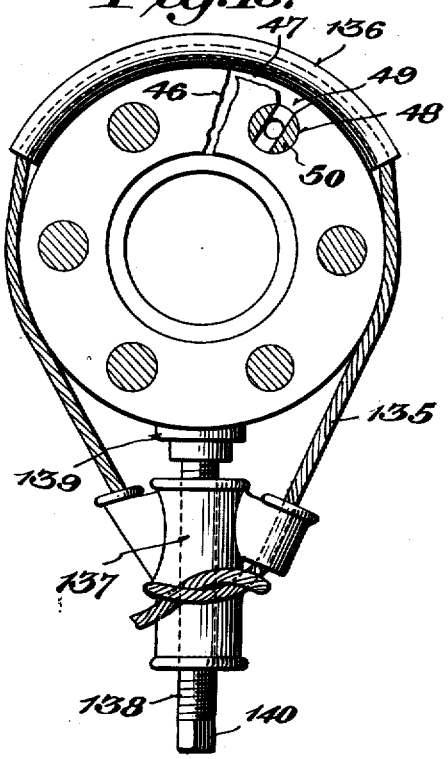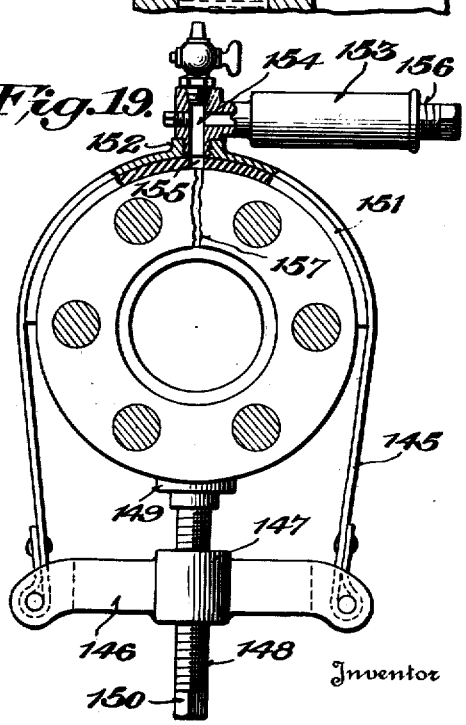

Patented Mar. 8, 1927.

1,620,154

UNITED STATES PATENT OFFICE.

EUGENE C. FURMAN, OF NEWPORT NEWS, VIRGINIA, ASSIGNOR OF FORTY-NINE PER CENT TO EDMUND F. HEARD, OF HAMPTON, VIRGINIA.

METHOD AND APPARATUS FOR REPAIRING FLUID CONTAINERS.

Original application filed March 30, 1925, Serial No. 19,452. Divided and this application filed August 6, 1925. Serial No. 48,657.

This invention relates to a method and to apparatus whereby containers for fluids, particularly fluids under pressure, may be repaired upon the occurrence of a leak without dismantling the container or relieving the pressure therein. In so far as the method is involved, this application is a division of my prior application, Serial No. 19,-452, filed March 30, 1925, and entitled "Leak sealing method and means for pressure containers", and in so far as the apparatus is involved, this application is a continuation in part of the aforesaid application, Serial No. 19,452.
Both in the initial testing of containers for fluids, particularly fluids under pressure, such as pipe lines for conveying steam, water, air, gas, oil, chemicals, etc., or cylinders, digesters and the like, and also at times during the use of such containers, leaks are likely to occur. For example, pipe lines, cylinder and digester heads and the like, are commonly provided with gaskets at the joints, such gaskets being interposed between the juxtaposed faces of the elements of the pipe couplings or between the cylinder and its head, etc., and secured in place by bolts, screws, stud bolts or other devices of similar character which pass through or around portions of the container to hold the sections or members in position, and it frequently occurs that a leak develops at the joint, either through or around the gasket, which cannot be remedied by merely tightening the bolts or other fasteners. Again, joints in pipe lines and other pressure containers are sometimes made by carefully machining contacting faces or fitting the parts to each other so that an interposed gasket is unnecessary and leaks not infrequently develop at these joints because of imperfect work or subsequent wear. Leaks also arise from the presence of blow holes, sand holes, corrosion, cracks, etc., in the parts of the container, or fluid may escape by reason of apertures occupied by bolts, studs, screws or other fasteners. It is therefore to be expressly understood that the term "leak" as used herein is to be taken as generic to any cause for an undesigned escape of fluid, whether due to the imperfect fitting or the wear of parts, or the presence of holes or other imperfections in the parts, or the presence of apertures (like bolt holes) which afford unintended leakage paths.

Heretofore when a leak of this character has developed it has been necessary to relieve the container of its pressure, and generally to disconnect the parts of the container, in order to repair or replace the gasket, or to machine the fitted surfaces, or to stop up the hole or other path through which leakage is occurring, etc., entirely new parts being frequently required where the old parts could not be readily repaired so as to stop the leakage by methods heretofore in use. Hence the repair of leaks which could not be stopped by the mere tightening of bolts or other fasteners has required that the container be put out of service during the period of repair, which is frequently attended with inconvenience and losses outside of the mere repair of leaky parts, since the cutting off of the steam in a steam line, for example, may mean the shutting down of an entire plant, with its attendant losses in time, labor and output.

It is an object of this invention to provide a method and apparatus for repairing leaks which is available for use without relieving the container of pressure and without dismantling the parts of the container. Inasmuch as the method and apparatus of this invention are available whether the pressure in the container is below or above atmospheric pressure (and also at atmospheric pressures), the term "pressure" herein is to be understood as generic to either of these conditions.

Again, if a leak is not promptly repaired it may increase in size with time. For example, a leak may start by reason of a broken or worn gasket but the escaping fluid may wear a groove into one or both of the faces between which the gasket is interposed, so that the mere replacement of the gasket is not sufficient to stop the leak.

It is an object of this invention to provide a method and apparatus for repairing leaks which will be effective in stopping a leak even under the conditions just referred to, and which is available without relieving the container of its pressure or without dismantling its parts.

Again, in the case of pipe lines and other long containers where the working temperature of the same is either above or below that of the surrounding atmosphere, difficulty is often experienced in connection with the making of repairs of leaky joints owing to the fact that when the container is cut out of service for the purpose of making repairs its temperature is materially different from that when the container is in service, and a joint that is tight at a temperature approaching atmospheric may develop leaks when the container is contracted or expanded by reason of a substantial change in its temperature.

It is an object of this invention to provide a method and apparatus for repairing leaks which permit the leak to be repaired under the actual conditions of service so that the leak may be stopped under the very conditions attendant on its development.

A further object of this invention is to provide a method and apparatus for repairing leaks which are applicable to the correction of leaks in the usual forms of joints to be found in containers, and which therefore do not require the use of any special form of joint in order to use the method and apparatus of this invention.

Another object of this invention is to provide a method and apparatus for repairing leaks which do not require the exercise of special skill and therefore may be used by ordinary workmen; which are inexpensive and expeditious and yet highly efficient; and which require the use of only relatively small and simple devices that may be readily carried from place to place and applied to the leaky parts without the expenditure of much time or labor.

Other objects will appear as the description of the invention proceeds.

Stated briefly, the invention comprises a method and apparatus for repairing leaks wherein, without the necessity of relieving the leaky container of its pressure or the dismantling of its parts, a suitable leak-sealing medium is injected into the leak by the use of a pressure greater than the pressure existing in the container while flow of the sealing medium exteriorly of the container is prevented.

The invention is capable of being carried out in a variety of ways and by the use of a variety of apparatus; on the accompanying drawings I have illustrated a number of different forms which the apparatus may take in embodying, and in carrying out the method of, my invention, but it is to be expressly understood that the drawings are for the purpose of illustration only and are not to be construed as a definition of the limits of the invention, reference being had to the appended claims for that purpose.

In said drawings,

Fig. 1 is a sectional view showing one manner and apparatus by which the sealing medium may be injected into a leak and restrained against flow in other directions, constituting an embodiment of my invention;

Fig. 2 is a sectional view on the line 2—2 of Fig. 1;

Fig. 3 is a sectional view illustrating another embodiment of my invention;

Fig. 8 is a view illustrating another manner and apparatus by which such isolated space in communication with the leak may be formed;

Fig. 9 is a sectional view illustrating another apparatus which may be used for injecting the sealing medium into the leak;

Fig. 10 is a sectional view illustrating another apparatus which may be used for injecting the sealing medium into the leak;

Fig. 11 is a somewhat schematic view illustrating a tool which may be used in forming a passage for the sealing medium in a gasket;

Figs. 12 and 13 are views illustrating different forms of devices for preventing the flow of the sealing medium other than into the leak;

Fig. 14 is a sectional view illustrating the application of my invention to the closing of a leak in a threaded joint;

Fig. 15 is a sectional view illustrating another apparatus for injecting sealing medium into a leak;

Fig. 16 is a view illustrating another manner and apparatus by which an isolated space in communication with the leak may be formed;

Fig. 17 is a view illustrating another manner of closing a leak in conformity with the present invention;

Fig. 18 is a view illustrating another apparatus for preventing the flow of the sealing medium other than into the leak;

Fig. 19 is a view illustrating yet another embodiment of the present invention;

Figure 4:
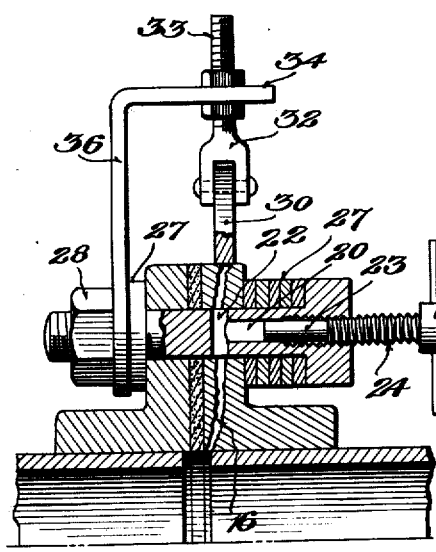
Fig. 4 is a sectional view illustrating the application of my invention to the filling of a leak caused by a blow hole or similar defect.

Referring more in detail to the drawings, Figs. 1 and 2 illustrate the application of my invention to the repairing of a leaky gasket in a pipe line. In the form shown, the two sections of pipe 10 and 11 are provided, in any suitable way, with flanges, 12 and 13 respectively, which are held together by any suitable number of bolts 14, and to render the joint fluid tight, a gasket 15 of any suitable material is interposed between the flanges 12 and 13. While the gasket 15 has been shown as co-extensive with the faces of the flanges 12 and 13, it is to be understood that the invention is equally applicable where the pipe joint is so designed that the gasket is of less extent. As shown in Fig. 2, the gasket 15 has developed a leak, diagrammatically illustrated at 16, in line with one of the bolt holes.

By means of the present invention the leak 16 may be sealed without the necessity of relieving the pipe line of its pressure, or the disconnection of the parts of the pipe joint, or even the replacement of the gasket. In the practice of this invention the bolt 14 is removed from the hole with which the leak communicates, and there is positioned within said hole a device of any suitable character by which a sealing medium may be injected under pressure into the leak. In the form shown, said device 17 is in the nature of a bolt provided with a head 18 at one end, and threaded at its opposite end as shown at 19. Extending axially from one end of the bolt-like device 17 is a passage 20, shown as enlarged and interiorly threaded at its outer end 21 where it leads through the head 18. At its inner end passage 20 terminates in one or more transverse passages 22 extending to the outer surface of the bolt-like device. These lateral passages 22 may be radial with respect to the bolt-like device 17, or they may be inclined as illustrated.

Mounted within said passage 20 is any suitable device for exerting relatively high pressure upon the sealing medium to be placed therein. In the form shown, a plunger 23 which fits the inner portion of the passage 20 is provided with an enlarged and exteriorly threaded portion 24 for reception in the interiorly threaded portion 21 of said passage. The outer end of said plunger is provided with a head 25 and any suitable means for rotating the plunger, such as a handle or cross-bar 26. By rotating the plunger 23 it may be advanced into the passage 20 owing to the coaction of the threads 21 and 24, and thereby a high pressure exerted on the sealing medium which has been previously placed in the passage 20.

Although the bolt-like device 17 may be provided with two or more sets of lateral passages 22 for registry with the gasket space with different sizes of flanged couplings, it is preferable to so construct the bolt-like device that it may be adjusted to bring the lateral passages 22 into proper register with the gasket space. In the form shown the bolt-like device 17 is made of sufficient length so that any suitable number of washers 27 may be interposed between the head 18 and the flange of the coupling, and the opposite threaded end of said device is provided with a suitable nut 28 which, when set up, will clamp the bolt-like device 17, with its washers 27, in fixed position with its transverse passages 22 in proper register with the gasket space. In a proper case, the gaskets may also be interposed between the nut 28 and its adjacent flange of the coupling. If desired, the bolt-like device may be threaded at both ends and provided with nuts, so that by proper adjustment of the nuts the bolt-like device 17 may be clamped in position with the passages 22 in registry with the gasket space without the necessity of using washers.

Associated with the aforesaid means for injecting the sealing medium under high pressure into the leak, are means for confining the sealing medium within the leak or preventing escape of the sealing medium through any opening adjacent to said leak to the exterior of the container, said means also serving the subsidiary function of preventing displacement of the gasket in the neighborhood of the leak by reason of the high pressure applied thereto. Said sealing means may be of any suitable construction. In the form shown, a plate-like abutment member 30, of any appropriate shape and size but suitably curved at its inner edge 31 so as to conform with the curvature of the periphery of the flanges or the gasket, is pivoted in any suitable way, as by means of a bolt 32, between the bifurcated ends of threaded rod or post 33. Said threaded rod is suitably mounted in a bracket 34, preferably in a slot so that it may be adjusted to bring the abutment member 30 into alignment with the gasket, and is retained in adjusted position in any suitable way as by one or more, preferably two, nuts 35 positioned on either side of the bracket 34. Bracket 34 may be mounted or supported in any suitable way to enable the plate-like abutment member 30 to be firmly held against displacement from engagement with the periphery of the flanges or the gasket. For simplicity and convenience the bracket 34 is shown as of generally right angular construction and the leg 36 thereof is provided with an aperture 37 so that it may be clamped in position between the nut 28 and the flange of the coupling. Abutment member 30 may be as narrow as the gasket, but is preferably wider so that when in position it will overlap the flanges on either side of the gasket as shown.

In carrying out the method of my invention as here exemplified, the bolt-like device 17 is inserted in the bolt hole at the place of the leak, and suitably adjusted, as by the interposition of washers 27, so that the lateral passage or passages 22 communicate with the gasket space. The bracket 36 is then mounted on the bolt-like device 17 and the nut 28 set up so as to firmly clamp the parts in position. The plate-like abutment 30 is then aligned with the gasket and engaged with the periphery of the flanges 12 and 13 and interposed gasket 15 at either side of the leak 16. The threaded rod or post 33 is then adjusted by means of the nuts so as to force said abutment member 30 into firm contact with the periphery of said flanges and the gasket, in which position it is fixedly clamped by said nuts. A sealing medium having been placed in the passage 20, the plunger 23 is manipulated so as to advance the same into the passage 20 and thereby exert a sufficiently high pressure on the sealing medium to overcome the pressure in the interior of the pipe line or other container. Owing to this exertion of this pressure on the sealing medium, the latter is forced into the leak 16, its escape to the exterior of the container being prevented by reason of the abutment member 30 which seals the outer end of the leak during the injection of the sealing medium, although in practice there may be a slight escape of sealing medium past the abutment member without affecting the result, the resistance to escape of the sealing member, afforded by this member, assuring the sealing of the leak.

Any suitable sealing medium may be employed. I prefer to use a compound containing rubber or a rubber substitute which will vulcanize under the effect of heat, although I may use any suitable compound in which hardening occurs by reason of crystallization, chemical action, etc. If desired, the sealing midum may contain inert material such as cork, sawdust, asbestos, etc., and this inert material may be mixed with such substances as graphite, beeswax, litharge, commercial cement, lubricating oil, glycerine, shellac, or the bases for cemmercial cements like "smooth-on," etc. The proportion of the component materials may vary within considerable limits and the character of the sealing medium used may vary with the character of the fluid which is within the container, as obviously the sealing medium must not be one that is affected by the leaking fluid. Where the container is at a sufficiently high temperature by reason of the fact that the contained fluid is at high temperature, as in the case of steam for instance, this heat of the container may be utilized for causing the sealing medium to vulcanize—when a vulcanizable sealing medium is used—or, if the container is not at a sufficiently high temperature and a vulcanizable sealing medium is used, heat may be applied during or following the injection of the sealing medium into the leak so as to effect vulcanization. If a sealing medium is used which is not fluid at the temperature of the container, heat may be preliminarily applied to render the sealing medium sufficiently fluid for injection into the leak.

When the sealing medium has become set, whether by vulcanization, crystallization, chemical action or otherwise, the device heretofore described for injecting the sealing medium into the leak, together with its cooperating abutment elements, may be withdrawn and the original bolt reinserted in the aperture—or, if desired, the bolt-like device 17 may be used in place of the original bolt, the bracket 36 with its supported parts being removed and the plunger 23 being withdrawn and the passage 20 being suitably plugged. The latter procedure is useful when it is desired that the location of the repair be indicated in some way, as the plugged bolt-device 17 will be a readily-understood marker of the location of the leak which has been corrected.

It will therefore be perceived that this method of repairing a leak may be employed without relieving the container of its pressure or dismantling the parts of the joint at which the leak has occurred. Moreover, if the fluid in the container is at a temperature different from that of the surrounding medium, the leak may be stopped while the parts are at their normal temperature, so that the retainer is repaired under the actual conditions of service, which assures that the repair will be effective under such conditions. Also, if the leak has been accompanied by any scoring of the faces of the metal parts at the joint, so that the mere replacement of the gasket might not be sufficient to stop the leak, the present method of repairing the leak is still completely effective, as the sealing medium will enter and stop up the path of escape of the fluid which constitutes the leak whatever may be its size or location. The sealing medium may also be injected through a plurality of bolt holes, if desirable, so as to fill all spaces between the members of the joint. For example, if the bolts of the joint have been tightened to such an extent as to dish the metal parts, the sealing medium may be forced into the cavity or space between the members of the joint by injecting the same through a plurality of bolt holes so as to completely seal the joint.

While the embodiment of the invention heretofore described has involved a gasket coextensive with the flanged faces of the joint, it is to be expressly understood that the invention is equally applicable to other forms of joints, as for example, where the gasket is located entirely inwardly of the series of bolts, or where a male and female joint is used either with or without a gasket, or where no gasket is used but the abutting faces of the joint are machined or otherwise fitted so as to constitute a fluid-tight joint. It is also to be understood that the embodiment heretofore described is equally applicable to joints in other containers as well as in pipe lines.

In the embodiment of Fig. 3 the invention is shown as applied to the correction of a leak in a joint between a cylinder and its head and where a stud bolt or tap-screw is used as the connecting element. In this embodiment the device 37 for injecting the sealing medium takes the general form of a stud bolt, and at its inner end is suitably threaded as shown at 38 for engagement with the threads of the bolt or screw hole 39. The bracket 34, 36 for supporting the abutment device is here shown as mounted on the injection device 37 before it is introduced into the hole 39, and a suitable number of washers 27 are interposed between the bracket leg 36 and the cylinder head, or between the head of the device 37 and the bracket leg 36, or both, to properly locate the lateral passage or passages 22 with respect to the gasket space. Otherwise the construction and manner of operation and the method of stopping the leak in the embodiment of Fig. 3 is the same as that of Figs. 1 and 2.

Fig. 4 illustrates an embodiment of the invention wherein the leak takes the form of a blow hole or sand hole or other flaw or imperfection in a member of the joint, it being assumed that the leak communicates with a bolt or screw hole or other aperture in the joint members. As in the embodiments heretofore described the bolt or screw at the leak is removed, and a suitable device, such as that heretofore described, for injecting a sealing medium into the leak is positioned with its transverse or lateral passage or passages 22 in communication with the leak, and the sealing medium is forced into the leak to seal the same as heretofore described. The means for preventing escape of the sealing medium to the exterior of the joint in this figure is the same as heretofore described.

Figure 5:
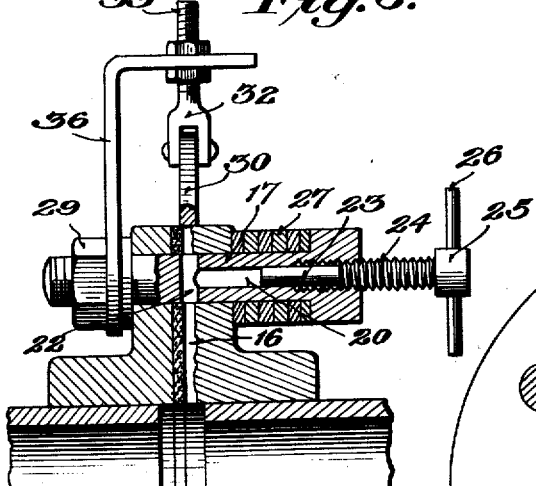
Fig. 5 is a sectional view illustrating the application of my invention to the sealing of a groove or other imperfection or irregularity in the surface of one of the members of a joint.

Fig. 5 illustrates an embodiment of the invention wherein the leak is caused by the presence of or includes a groove or passage in the face of one of the members of the joint, such as may be caused by corrosion, deep scratches or other flaws or imperfections in the face of the flange, or by the scoring accompanying a leaking gasket. This figure also illustrates how the scoring of one of the faces may be remedied even though a new gasket has been introduced. The method of procedure here illustrated is also equally applicable where the joint is made by machined or fitted faces without the use of a gasket and where the absence of sealing contact between the members of the joint would result in a leakage of the contained fluid. By this invention, however, any leak arising from the failure of the elements to make sealing contact can be corrected by the injection of a sealing medium as heretofore described.

Figure 6:
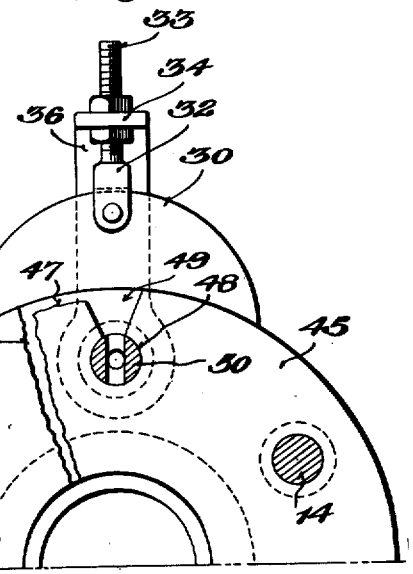
Fig. 6 is a view illustrating the application of my invention to the sealing of a leak which does not communicate with a bolt hole or similar aperture.

In the embodiments of the invention so far described it has been assumed that the leaks communicate with a bolt or screw hole or other aperture, so that the sealing medium may be forced directly into the leak from a suitable device positioned in said hole or aperture. In Fig. 6 an embodiment of my invention is illustrated wherein the leak does not communicate directly with a bolt hole. In the form here shown 45 is a gasket held between joint members of any suitable character, as in a pipe line or between a cylinder and its head, etc., and a leak is diagrammatically illustrated at 46 between the connecting elements of the joint. To effect the sealing of this leak a passage may be created in any suitable way between the leak and a bolt hole or other suitable aperture, as by chipping, cutting or otherwise forming a channel 47 in the periphery of the gasket from the leak 46 to the proximity of a bolt hole 48 and extending said passage to said bolt hole, as shown at 49. This may be done, for example, by driving a wedge-shaped tool 51 (shown in Fig. 11), provided with a suitable handle 51' for conveniently holding the same, into the gasket material until an opening to the bolt hole is made therein. A siutable device 50 for injecting the sealing medium, which device may be of one of the forms heretofore or hereinafter described, is then positioned in the bolt hole 48, and a suitable sealing device 30, which may be of one of the forms hereinbefore or hereinafter described, is positioned in contact with the periphery of the joint members so as to completely seal the passage 47, 49 extending between the bolt hole 48 to the leak 46, and the sealing medium is then injected into the leak in the manner hereinbefore described.

Figure 7:
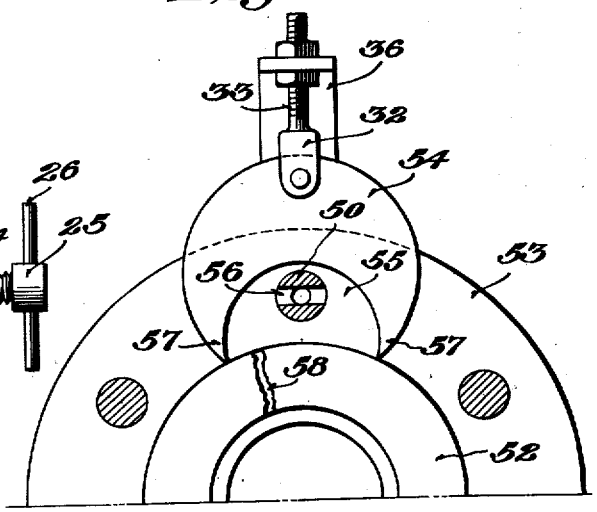
Fig. 7 is a view illustrating another manner and apparatus by which escape of the leak-sealing medium may be prevented by providing an isolated space, in communication with the leak, into which the sealing medium may be injected.

The embodiment of Fig. 7 illustrates a sealing device that may be used where the gasket 52 does not extend to the periphery of the joint members and there is sufficient clearance between the members 53 of the joint to enable a plate 54 to be introduced between the same. Plate 54 is selected of such thickness as to tightly fit the clearance space between the joint elements 53, or several thin plates may be used to make up the desired thickness, and said plate or plates are so shaped as to provide a chamber 55 which will include a bolt or screw hole 56 or other suitable aperture when the tips 57 of the member 54 are forced into intimate contact with the periphery of the gasket 52. In practice, a set of plates of different thicknesses and having recesses 55 of different sizes and shapes may be carried on hand. In repairing a leak the bolt, screw or other fastening device nearest the leak, diagrammatically illustrated at 58, is withdrawn, and the plate-like member 54 is forced into the space between the joint elements 53. Thereby a segregated or isolated space 55 is provided which is in communication both with the bolt hole 56 and the leak 58. An injection device 50 of any suitable type as hertofore or hereinafter described is inserted in the bolt hole 56, and the leak-sealing medium is forced into said chamber or isloated space 55, from which chamber it flows, and can only flow, into the leak 58 to seal the same.

Another manner of providing a segregated or isolated chamber in communication with a bolt or screw hole or other aperture and communicating with a leak is shown in Fig. 8. In this embodiment of the invention a flexible element 59 of any suitable character that will completely fill the space between the joint members 53 in an axial direction, and which may be in the form of a rope, wire, cable, band, etc., is passed between the members of the joint after a suitable device 50 for injecting a sealing medium has been introduced into a bolt hole or other aperture adjacent the leak, and suitably clamped against the periphery of the gasket 52 as by twisting, tying or otherwise fastening the same to a device 60 for exerting tension thereon. As shown, said device 60 is in the form of an interiorly threaded tubular element 61 provided with a head through, around or beneath which the rope, wire, cable or band 59 may be secured, and through the threaded element 61 extends a threaded rod 62 provided with a head 63 for engaging the periphery of the container while, at its opposite end, there is a head 64 which may carry a suitable handle or be shaped for engagement with a wrench. By rotation of said threaded rod 62, the rope, wire, cable or band 59 may be placed under tension to form an isolated chamber 65 between the same and the periphery of the gasket 52, said chamber being in communication with the leak 58 and the hole 56 in which the injection device 50 has been positioned. The method of procedure is then as described in conjunction with the embodiment of Fig. 7.

Fig. 9 illustrates another embodiment of the present invention in which the device for injecting the sealing medium does not take the form of an axially bored bolt or screw. In this embodiment the bolt 66 affords a passage 67 between its periphery and the wall of the hole 68 in which the bolt is positioned. If the bolt which is employed in the normal construction of the joint does not tightly fit its hole, no additional bolt is necessary, but the clearance between the bolt and its hole may be utilized as the passage for the injection of the sealing medium. If the bolt of the normal construction of the joint fits its hole tightly, a substitute bolt 66, which leaves a clearance between the bolt and the hole is substituted, or a bolt may be used which is flattened, grooved, or otherwise differently shaped from the hole so as to provide one or more passages 67 between the bolt and the hole. A member 69, interiorly threaded or otherwise suitably formed at 70 to receive a plunger 71 and provided with a chamber or passage 72, with or without longitudinal grooves to facilitate the flow of the sealing medium, is suitably clamped or screwed in position over the projecting end of the bolt 66, with or without the interposition of suitable washers 27, if desired. The sealing medium having been placed in the chamber 72, threaded plunger 71 is then forced into the same by rotation of the plunger, the outer end of said plunger 71 being suitably provided with a handle or shaped to take a wrench, etc., and the sealing medium is thereby forced from the chamber 72 through the clearance space or passages 67 between the bolt 66 and its hole 68 into the leak indicated at 73. The opposite end of the hole 68 is suitably closed, as by washers 74 or the head of the bolt, and the escape of the sealing medium to the exterior of the container is prevented in any suitable way as hereinbefore or hereinafter described, the particular construction shown comprising a plate-like member 54 for forming a segregated or isolated chamber around the hole 68 and in communication with the leak 73 of the type illustrated in Fig. 7.

Fig. 10 illustrates a similar method of procedure, the bolt 75 being shown as provided with grooves 76 for the introduction of the sealing medium into the leak 73. The means for preventing escape of the sealing medium is here shown as an abutment plate 30 of the form illustrated in Figs. 1 to 6 inclusive. This embodiment of the invention, however, illustrates a procedure which may be followed where the container is so located as to make it inconvenient or uncomfortable to apply the pressure to the sealing medium directly at the joint—for example, where the container is so located that a wrench or handle could not be turned at the joint or where the container is at such a high temperature, as might occur in a steam line, as to make it uncomfortable to operate directly at the joint. In this embodiment a member 79 is suitably secured on or clamped over the projecting end of the bolt and provided with an interior passage 80 for communication with the grooves or other clearance space between the bolt and its hole. Said member 79 is shown as extending generally at right angles to the axis of the bolt, although it may extend at any other suitable angle or in the line of the bolt. The outer end of the member 79 has threaded thereinto or otherwise suitably attached thereto a coupling 81 which connects a pipe 82 to the member 79, said pipe being preferably of flexible construction. Said pipe 82 leads to any suitable pressure applying device at any suitable distance from the member 79. A sealing medium being placed in the passage 80 and pipe 82, pressure is applied to the sealing medium in the manner heretofore described whereby it is injected through the grooves 76 into the leak 73.

Fig. 12 illustrates another method of forming a segregated or isolated chamber in communication with a bolt or screw hole or other aperture 83 and a leak 84. In this embodiment a plurality of plates 85, of a thickness to tightly fit the space between the flanges or other members of the joint, are forced into position on either side of the leak 84 and the aperture 83, these plates 85 being shown as located in contact with the bolts, screws or other fastening means 86 on either side of the leak so that the latter will constitute abutments to prevent displacement of said plates 85. In this embodiment the means for preventing escape of the sealing medium to the exterior of the container is in the form of an arcuate plate 87, which may or may not be provided with a facing 88 of flexible material such as rubber, leather, etc. The peripheral extent of said plate 87 is such as to extend on either side of the chamber between the plates 85 so as to completely isolate a chamber 89 between said plates 85, the arcuate plate 87 and the gasket 52. A rope, wire, cable or other like element is suitably attached to said arcuate plate 87, being shown as passing around the same and through apertures in ears on said plate, and its ends are suitably attached to a clamping device 60 of the type described in conjunction with the embodiment of Fig. 8. By rotating the threaded post 62, the rope, wire, cable, etc., can be placed under tension so that the arcuate plate 87 will be firmly clamped in contact with the periphery of the container and prevent the escape of sealing medium from the chamber 89. The sealing medium is forced through any suitable injection device 50 positioned in the aperture 83 and after filling the chamber 89 it flows into and closes the leak 84.

Fig. 13 illustrates another manner of preventing the escape of the sealing medium to the outside of the container. In this embodiment a plate-like member 90, of any suitable shape but curved at its inner edge so as to conform with the periphery of the container, carries in any suitable way a rope, wire, cable or like element 91 which may be placed under tension by a clamping device 60, 62 of the type heretofore described in conjunction with the embodiments of Figs. 8 and 12. Plate 90 should at least be as wide as the gasket or space between the members of the joint, and is preferably made somewhat wider so as to engage the joint members on either side of the gasket space. Said plate-like element 90 is firmly clamped in contact with the periphery of the container at the location of the leak, an injection device 50 of any suitable construction is positioned in a bolt, screw or other hole in communication with the leak 92, and the sealing medium is forced under pressure into said leak.

The embodiment of Fig. 14 illustrates the application of the present invention to the sealing of a leak in a threaded joint, whether in a pipe line or other container. In this embodiment the device for injecting the sealing medium is made in any suitable way so as to be clamped upon or about the pipe 96, being shown as comprising a generally right-angular main portion 95 which may be clamped to the pipe 96 by means of any suitable clamping device 97, and associated with means whereby said device may be forced against the end of the pipe section 98, here shown as comprising an abutment device 99, which is also clamped to the pipe 96 by means of a clamping device 100, and screws 101 for forcing the portion 95 against the end of pipe 98. The injection device 95 is provided with an interior chamber 102 from which leads a lateral passage 103. Chamber 102 is provided with a plunger 104 shown as threaded thereinto, so that the requisite pressure may be exerted upon the sealing medium in the chamber 102 to force the same through passage 103 into the leak 105. A washer 106 may be provided between the portion 95 and the end of joint member 98 to prevent escape of the sealing medium, said washer being formed to provide a passage 107 therethrough for the sealing medium.

Fig. 15 illustrates another embodiment of the present invention wherein the sealing medium is injected into the leak from the exterior of the container instead of through a bolt hole, screw hole, or other aperture. In this embodiment of the invention, the injection device 108 is provided with an interior passage 109 leading to an outlet 110, which is shown as in a removable tip 111 threaded into the end of the member 108. Tip 111 carries a washer or facing member 112 of any suitable material, such as rubber, leather, etc., which is adapted to fit or conform itself to the shape of the periphery of the container. The injection device 108 is clamped against the periphery of the container at the location of the leak in any suitable way, as by means of a clamping device 60, 62 of the type heretofore described in conjunction with the embodiments of Figs. 8, 12 and 13, the outer side of member 108 being preferably provided with a depression 113 to receive the head 63 of the threaded post 62. Means of any suitable character for injecting the sealing medium through the passage 109, 110 may be provided. In the form shown, an interiorly threaded tubular element 114 is attached to the threaded end 115 of the member 108, and a threaded plunger 116 works in the tubular element 114 when rotated by means of a handle or wrench applied to the end or head 117, whereby the requisite pressure is developed to inject the sealing medium into the leak 118. In this embodiment, escape of the sealing medium other than into the leak 118 is prevented by the fact that the washer or facing member 112 is forced into intimate contact with the periphery of the container to form a fluid-tight joint by the clamping element 60, 62 which is provided with a suitable rope, wire, cable, etc., that passes around the container.

Fig. 16 illustrates another manner of forming an isolated or segregated chamber about a bolt, screw or other opening and in communication with the leak. In this embodiment a flexible band or other strip 120, of soft wire for example, is forced by any suitable tool, such as illustrated in dotted lines at 121, into the space between the flanges or members of the joint until its ends are in contact with the periphery of the gasket 122. This wire or strip 120 should be of such thickness that it completely fills in an axial direction the space between the flanges or members of the joint. Said wire or strip 120 may be made to embrace only one bolt hole or other aperture and the leak or, as shown, it may be made to embrace two or even more bolt holes or other apertures and the leak, here shown diagrammatically at 123. After the wire or strip 120 has been forced into position so as to form the segregated chamber 124, an abutment plate 125 suitably shaped to engage said wire or strip is inserted to back up said wire or strip, so that the pressure in the chamber 124 will not displace said wire or strip. Said plate 125 may be supported in any suitable way, as by means of a bracket and threaded post as heretofore described in conjunction with the embodiment of Figs. 1 and 2, for example. An injection device 50 of any suitable character having been inserted in one of the holes communicating with the chamber 124 as heretofore described, the sealing medium is forced under pressure into said chamber and, as it can only escape therefrom into the leak 123, the latter is effectually sealed.

The embodiment of Fig. 17 illustrates the use of the present invention where there is sufficient clearance between a stud bolt, for example, and its surrounding member, to permit injection of the sealing medium into the leak under pressure. The stud bolt 126 has mounted thereon in any suitable way an injection device 127 provided with a chamber 128 for receiving the sealing medium, said chamber being provided with one or more grooves 129, or being otherwise suitably formed, so that the sealing medium may be forced from the chamber 128 through the clearance space 130 between the stud bolt 126 and its surrounding member 131. Where there are contacting surfaces as at 132 from which the sealing medium may possibly escape, such escape may be prevented by the use of any suitable device such as herebefore or hereafter described. In the form shown, a wire cable or rope 133 provided with a rubber or other flexible sheath 134 is tightly clamped in any suitable way at the junction of the members so as to prevent escape of the sealing medium. This method of procedure has the advantage that the stud bolt 126 does not have to be removed in order to seal the leak and therefore can be used without putting the container out of service where the aperture for the stud bolt communicates with a fluid-containing space, as for example the water jacket of an engine cylinder.

Fig. 18 shows another manner of preventing escape of the sealing medium to the exterior of the container. A cord, wire, cable or like member 135 is provided with a rubber or other suitable sheath 136 and connected with a clamping member 137, so that the rubber sheath 136 may be clamped in a fluid-tight relation about the periphery of the container in the location where escape of the sealing medium is to be prevented. Clamping member 137 has an interiorly threaded hole in which works a threaded post 138 suitably shaped at its inner end 139 for engagement with the periphery of the container and suitably provided with a head 140 to which a handle, wrench or other device may be applied to rotate the post 138 and thereby place the rope, wire, cable or other element 136 under tension.

The embodiment of Fig. 19 shows another construction by which the sealing medium may be injected from the periphery of the container. A flexible band or strip 145 is suitably attached at its opposite ends to the opposite arms 146 of a clamping element 147 interiorly threaded to coact with a threaded post 148 which, at its inner end, has a head 149 for engagement with the periphery of the container and, at its oppposite end, a head 150 whereby a handle or wrench may be applied for rotating the threaded post 148. Band 145 may be itself clamped into engagement with the periphery of the container, but it is preferably provided with an inner facing of rubber, leather, felt, belting, or other suitable material 151 which will conform more intimately with the periphery of the container under the tension applied by the rotation of the threaded post 148. Band 145 is provided with an interiorly threaded nipple 152, and threaded into said nipple is an injection device 153 of any suitable construction. Injection device 153 has interior passages 154 leading to a passage 155 through the band 145 and the facing 151, and any suitable means, as a threaded plunger 156, is provided for exerting pressure on the sealing medium within the injection device. The band 145 is clamped to the periphery of the container with the passage 155 in communication with the leak 157 and the sealing medium is injected under pressure into said leak. This manner of procedure does not require the removal of bolts, screws, or other connecting elements, and is also available where the leak does not communicate with a bolt hole or other aperture.

Figure 20:
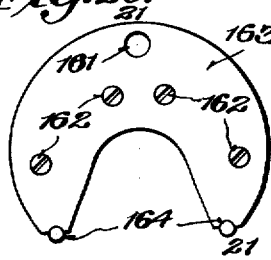
Fig. 20 is a face view of an adjustable abutment member.
Figure 21:
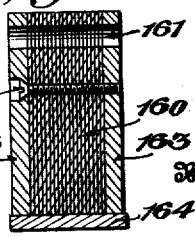
Fig. 21 is a sectional view of said adjustable abutment member.

Figs. 20 and 21 illustrate an abutment member of the character shown in Fig. 7 but designed to be adjustable for different widths of spaces between the joint members, although the principle of rendering the abutment member adjustable, here shown, may be used in other forms of such members. The abutment member comprises a plurality of thin shims or sheets 160 of suitable shape and of any suitable material, such as metal, fabric, fiber, rubber, commercial packing, paper, etc., provided with aligned apertures to form a hole 161 by which the member may be mounted in position and clamped together by any suitable number of clamping or adjusting screws 162. Preferably, although not necessarily, the shims or sheets are provided with cover plates 163 of thicker material between which the shims or sheets 160 are clamped and with which the screws 162 coact to effect the clamping of the shims or sheets. The ends of the cover plates 163 and the shims or sheets 160 may be grooved, and suitable soft material 164, such as lead, rubber, or the like, may be inserted or forced into said grooves. Slight adjustments of thickness may be obtained by tightening or loosening the screws 162, while larger adjustments are obtained by removing or adding shims or sheets 160, shorter or longer screws being used as needed. When this abutment plate is made of yieldable or elastic material, it possesses the advantage that it may give to conform with a space between joint members that are not exactly parallel. This adjustable abutment member obviates the necessity of keeping on hand a large number of abutment members to take care of the wide variety of widths between joint members, and is very useful in repairing leaks in joints of the type wherein collars or flanges are held in position by bolts, with or without the use of one or more gaskets clamped between said collars or flanges.

It will therefore be perceived that I have provided a novel method and apparatus for sealing leaks which may be employed without relieving the container of its interior pressure or dismantling its parts, although of course my method and apparatus are applicable to the repair of leaks if it is desired for any reason to relieve the interior pressure or dismantle the parts to a greater or less extent. The method and apparatus of this invention, moreover, are applicable without the necessity of varying the temperature or otherwise changing the conditions of service of the container, and hence leaks may be repaired under the conditions of actual service and without interrupting the use of the container in any way. The method of the present invention is one of extreme simplicity and therefore requires no special skill. It is also of universal application and requires no specially formed joints. It is also extremely efficient and effective whatever the cause of the leak, because it is applicable not only to leaky gaskets but to leaks between machined and fitted surfaces, and to leaks arising from blow holes, sand holes, corrosion, scratches and other imperfections whether arising from faulty construction or subsequent wear. It is also effective where the leak has been existing for a considerable period of time because the leak will be filled whether or not grooves have been worn into the surfaces of contiguous elements. It also effects a great saving in time, labor and expense because not only is the leak sealed without the necessity of replacing or machining any of the parts, but also without the necessity of discontinuing the service of the leaking element. Furthermore, the apparatus of the present invention is simple and compact and can be readily carried from place to place, applied and operated by a single workman.

While the embodiments more or less diagrammatically illustrated on the drawings have been described with considerable particularity, it is to be expressly understood that the invention is not restricted thereto. While for convenience the invention has been shown as applied to joints employing bolts, stud bolts, cap screws and similar connecting elements, the invention is equally applicable to joints in which other fastening means are employed, and also to other types of joints, the particular forms illustrated being selected as exemplary merely for the purpose of description. Nor is the invention limited to the particular combinations of injection devices and devices for preventing the escape of sealing medium as illustrated in the figures of the drawings. The injection devices and devices for preventing escape of sealing medium are more or less interchangeable, while various other forms of injection devices and devices for preventing the escape of sealing medium will now readily suggest themselves to those skilled in the art. For example, any of the embodiments may be combined with means for exerting pressure on the sealing medium at a distance from the container, analogously as illustrated in Fig. 10. Therefore it is to be expressly understood that in the broader aspects of this invention any suitable injection device may be utilized with any suitable device for preventing the escape of the sealing medium. Various changes may also be made in the details of construction, arrangement, material, dimension and parts, the heretofore described and illustrated embodiments being selected as suitable, and at present preferred, but not necessarily exclusive. Reference is therefore to be had to the claims hereto appended for a definition of the limits of the invention.

In said claims the expression "conventional containers" is employed to designate containers which require no special provision, as originally constructed, for the reception of the leak sealing medium.

What I claim is:—

1. The method of repairing leaks applicable to conventional containers without the necessity of relieving the container of its interior pressure which includes injecting a sealing medium into the leak at a pressure greater than that within the container, and preventing escape of the sealing medium exteriorly of the container.

2. The method of repairing leaks applicable to conventional containers without the necessity of relieving the container of its interior pressure which includes injecting a sealing medium into the leak at a pressure greater than that within the container, permitting said sealing medium to harden in the leak, and preventing escape of the sealing medium exteriorly of the container during the period of injection and hardening.

3. The method of repairing leaks applicable to conventional containers without the necessity of relieving the container of its interior pressure which includes injecting a vulcanizable sealing medium into the leak at a pressure greater than that within the container, returning said sealing medium in the leak while it vulcanizes, and preventing escape of the sealing medium exteriorly of the container during the period of injection and vulcanization.

4. The method of repairing leaks applicable to conventional containers without the necessity of relieving the container of its interior pressure which includes sealing the leak with a sealing medium at a pressure sufficient to overcome the pressure of the leaking fluid while preventing escape of the sealing medium from the leak.

5. The method of repairing leaks applicable to conventional containers without the necessity of relieving the container of its interior pressure which includes sealing the leak at a pressure sufficient to overcome the pressure of the leaking fluid with a sealing medium which will harden in the leak, and preventing escape of the sealing medium from the leak during the period of hardening.

6. The method of repairing leaks applicable to conventional containers without the necessity of relieving the container of its interior pressure which includes sealing the leak at a pressure sufficient to overcome the pressure of the leaking fluid with a sealing medium which will vulcanize in the leak, and preventing the escape of the sealing medium from the leak during the period of vulcanization.

7. The method of repairing leaks applicable to conventional containers without the necessity of relieving the container of its interior pressure which includes placing in communication with the leak a device for injecting a sealing medium thereinto at a pressure greater than that within the container, placing adjacent the leak means to prevent the escape of the sealing medium from the leak, and injecting the sealing medium into the leak.

8. The method of repairing leaks applicable to conventional containers without the necessity of relieving the container of its interior pressure which includes placing in communication with the leak a device for injecting a sealing medium thereinto at a pressure greater than that within the container, placing adjacent the leak means to prevent the escape of the sealing medium from the leak, injecting the sealing medium into the leak, and retaining said sealing medium in the leak while it hardens.

9. The method of repairing leaks applicable to conventional containers without the necessity of relieving the container of its interior pressure which includes placing in communication with the leak a device for injecting sealing medium thereinto at a pressure greater than that within the container, placing adjacent the leak means to prevent the escape of the sealing medium from the leak, injecting the sealing medium into the leak, and effecting the vulcanization of the sealing medium in the leak.

10. The method of repairing leaks applicable to conventional containers without the necessity of relieving the container of its interior pressure which includes forming a passage for the flow of a sealing medium into the leak, and injecting into the leak a sealing medium at a pressure above that existing in the container.

11. The method of repairing leaks applicable to conventional containers without the necessity of relieving the container of its interior pressure which includes forming a passage for the flow of a sealing medium into the leak, injecting into the leak a sealing medium at a pressure above that existing in the container, and preventing escape of the sealing medium exteriorly of the container.

12. The method of repairing leaks applicable to conventional containers without the necessity of relieving the container of its interior pressure which includes forming an isolated chamber in communication with the leak, and injecting into said chamber and leak a sealing medium at a pressure above that existing in the container.

13. The method of repairing leaks applicable to conventional containers without the necessity of relieving the container of its interior pressure which includes forming an isolated chamber in communication with the leak, injecting into said chamber and leak a sealing medium at a pressure above that existing in the container, and preventing flow of the sealing medium other than into said chamber and leak.

14. The method of repairing leaks applicable to conventional containers without the necessity of relieving the container of its interior pressure which includes injecting under pressure into the leak a sealing medium which will harden therein.

15. The method of repairing leaks applicable to conventional containers without the necessity of relieving the container of its interior pressure which includes injecting into the leak under pressure a sealing medium which will vulcanize therein.

16. The method of repairing leaks applicable to conventional containers without the necessity of relieving the container of its interior pressure which includes forming a passage in communication with the leak and injecting into said passage and leak a sealing medium which will harden therein.

17. The method of repairing leaks applicable to conventional containers without the necessity of relieving the container of its interior pressure which includes forming an isolated chamber in communication with the leak, and injecting into said chamber and leak a sealing medium which will harden therein.

18. The method of repairing leaks applicable to conventional containers without the necessity of relieving the container of its interior pressure which includes injecting into the leak a sealing medium at a pressure above that existing in the container.

19. The method of repairing leaks applicable to conventional containers without the necessity of relieving the container of its interior pressure which includes sealing the leak with a sealing medium while preventing escape of the sealing medium from the container.

20. The method of repairing leaks applicable to conventional containers without the necessity of relieving the container of its interior pressure which includes sealing the leak with a sealing medium which will harden in the leak, and preventing escape of the sealing medium until it has hardened in the leak.

21. The method of repairing leaks applicable to conventional containers without the necessity of relieving the container of its interior pressure which includes sealing the leak with a sealing medium which will vulcanize in the leak, and preventing the escape of the sealing medium from the leak until after it has been vulcanized therein.

22. The method of repairing leaks applicable to conventional containers without opening the container which includes injecting into the leak a sealing medium which will harden therein, and preventing escape of said sealing medium through any other opening in the container from the leak to the exterior of the container.

23. The method of repairing leaks applicable to conventional containers without opening the container which includes sealing the leak under pressure with a sealing medium which will harden therein, and confining the sealing medium to the leak and communicating openings within the confines of the container during the period of injection and hardening.

24. The method of repairing leaks applicable to conventional containers without opening the container which includes injecting into the leak a sealing medium which will vulcanize therein and preventing escape of the sealing medium between contiguous surfaces of the container exterior of the leak, and effecting the vulcanization of said sealing medium in the leak.

25. The method of repairing leaks applicable to conventional containers without opening the container which includes forming a passage in the assembled container in communication with the leak, and injecting into the leak a sealing medium which will harden therein while preventing the flow of the sealing medium exteriorly of the container.

26. The method of repairing leaks applicable to conventional containers without opening the container which includes forming an isolated chamber within the confines of the container in communication with the leak, and injecting into said chamber and leak a sealing medium which will harden therein while preventing flow of the sealing medium exteriorly of the container.

27. The method of repairing leaks applicable to conventional containers without relieving the container of its interior pressure which includes removing a fastening element in proximity to the leak, and injecting into the leak through the passage thereby provided a sealing medium which will harden in the leak.

28. The method of repairing leaks applicable to conventional containers without dismantling the container which includes removing a fastening element in proximity to the leak, injecting through the passage thereby provided a sealing medium which will harden in the leak, and preventing escape of the sealing medium during the period of hardening.

29. The method of repairing leaks applicable to conventional containers without dismantling the container which includes removing a fastening element in proximity to the leak, injecting through the passage thereby provided a sealing medium which will vulcanize in the leak, and preventing escape of the sealing medium during the period of vulcanization.

30. The method of repairing leaks applicable to conventional containers without relieving the container of its interior pressure which includes removing a fastening element, forming a passage between the opening thereby provided and the leak, and injecting into the leak through said opening and passage a sealing medium which will harden therein.

31. The method of repairing leaks applicable to conventional containers without dismantling the container which includes removing a fastening element, forming a passage between the opening thereby provided and the leak, and injecting into the leak through said opening and passage a sealing medium which will harden therein while preventing flow of the sealing medium other than into said passage and leak.

32. The method of repairing leaks applicable to conventional containers without dismantling the container which includes removing a fastening element, forming an isolated chamber in communication with the passage thereby provided and the leak, and injecting into said chamber and leak a sealing medium which will harden therein.

33. The method of repairing leaks applicable to conventional containers without dismantling the container which includes removing a fastening element, forming an isolated chamber in communication with the passage thereby provided and the leak, and injecting into said chamber and leak a sealing medium which will harden therein while preventing flow of the sealing medium other than into said chamber and leak.

34. The method of repairing leaks applicable to conventional containers without opening the container which includes securing to the container an injection device in communication with the leak, and injecting into said leak a sealing medium which will harden therein while preventing escape of the sealing medium through any other opening in the container leading from the leak to the outside of the container.

35. The method of repairing leaks applicable to conventional containers without opening the container which includes securing to the container an injection device in communication with the leak, injecting into said leak a sealing medium which will harden therein, and wholly confining the sealing medium within the confines of the container.

36. The method of repairing leaks applicable to conventional containers without relieving the container of its interior pressure which includes securing to the container an injection device in communication with the leak, and by application of pressure remote from the leak injecting the sealing medium into the leak.

37. The method of repairing leaks applicable to conventional containers without opening the container which includes securing to the container an injection device in communication with the leak, injecting a vulcanizable sealing medium into the leak, and utilizing the heat of the container to effect vulcanization of said sealing medium in the leak.

38. The method of repairing leaks applicable to conventional containers without relieving the container of its interior pressure which includes attaching an injection device to the container in communication with the leak, injecting a softened sealing medium into the leak, and effecting hardening of said sealing medium in the leak.

39. The method of repairing leaks applicable to conventional containers without opening the container which includes securing an injection device to the container in communication with the leak, injecting into the leak a sealing medium which will harden therein, effecting the hardening of the sealing medium in the leak, and preventing escape of the sealing medium between contiguous surfaces of the container exterior the leak.

40. Means for repairing a leak applicable to conventional containers without opening the container including, in combination, an injection device for injecting a sealing medium under pressure into the leak, and means for preventing flow of the sealing medium out of other exterior adjacent openings in the container.

41. Means for repairing a leak applicable to conventional containers without opening the container including, in combination, an injection device for injecting a sealing medium under pressure into the leak, and means for preventing escape of the sealing medium through the contiguous joints of contacting surfaces exterior of said container.

42. Means for repairing a leak applicable to conventional containers without opening the container including, in combination, an injection device provided with means whereby a sealing medium may be forced under pressure into the leak, and means cooperating therewith for wholly confining the sealing medium within the confines of the container.

43. Means for repairing a leak applicable to conventional containers without dismantling the container including, in combination, an injection device adapted to be applied over the end of a bolt or other fastening means, means for operating said device whereby the sealing medium may be injected into and leak under pressure, and means for preventing escape of the sealing medium exteriorly of the container.

44. Means for repairing a leak applicable to conventional containers without dismantling the container including, in combination, an injection device adapted to be applied over the end of a bolt or other fastening means, and means for operating said device whereby the sealing medium may be injected into the leak under pressure.

45. Means for repairing a leak applicable to conventional containers without relieving the container of its interior pressure including, in combination, an injection device for forcing a sealing medium into the leak under pressure, and means for preventing escape of the sealing medium from the leak.

46. Means for repairing a leak applicable to conventional containers without relieving the container of its interior pressure including, in combination, an injection device for forcing a sealing medium under pressure into the leak, means for securing said injection device to the container in communication with the leak, and means for confining the sealing medium within the leak and openings in the container in communication therewith.

47 Means for repairing a leak applicable to conventional containers without opening the container including, in combination, an injection device for forcing a sealing medium under pressure into the leak, means for securing said injection device to the container in communication with the leak, and means for retaining all of the sealing medium within the confines of the container.

48. Means for repairing a leak applicable to conventional containers without opening the container including, in combination, an injection device for forcing a sealing medium under pressure into the leak, means for securing said injection device to the container in communication with the leak, and means for forming an isolated chamber within the confines of the container in communication with the injection device and the leak.

49. Means for repairing a leak applicable to conventional containers without opening the container including, in combination, an injection device for forcing a sealing medium under pressure into the leak, means for securing said injection device to the container in communication with the leak, means for confining the sealing medium within the container, and adjustable means for supporting said last-named means in operative position.

50. A portable mechanism of the character described including a member for conveying a sealing medium and provided with an outlet, means for forcing said medium through said outlet under pressure, means for securing said member to a container with said outlet in communication with a leak, and means associated with said member for preventing flow of said medium exteriorly of said container.

51. A portable mechanism of the character described including a member for conveying a sealing medium and provided with an outlet, means for forcing said medium through said outlet under pressure, means for securing said member to a container with said outlet in communication with a leak, means for adjusting the position of said member to bring said outlet into proper position, and means associated with said member for preventing flow of said medium exteriorly of said container.

52. A portable mechanism of the character described including a member for conveying a sealing medium and provided with an outlet, means for forcing said medium through said outlet under pressure, means for securing said member to a container with said outlet in communication with a leak, and means associated with said member for preventing flow of said medium exteriorly of said container, said last named means including a plate and means for forcing the same against the container.

53. A portable mechanism of the character described including a member for conveying a sealing medium and provided with an outlet, means for forcing said medium through said outlet under pressure, means for securing said member to a container with said outlet in communication with a leak, and means associated with said member for preventing flow of said medium exteriorly of said container, said last named means including a plate and means for adjustably supporting the same whereby the same may be properly located to prevent the escape of the ejected sealing medium.

54. A portable mechanism of the character described including a member for conveying a sealing medium and provided with an outlet, means for forcing said medium through said outlet under pressure, means for securing said member to a container with said outlet in communication with a leak, and means associated with said member for preventing flow of said medium exteriorly of said container, said last named means including a plate, a threaded member to which said plate is pivoted, a bracket in which said threaded member is adjustably mounted, and means cooperating with said threaded member for forcing said plate against the exterior of a container and locking said plate in adjusted position.

In testimony whereof I have signed this specification.

EUGENE C. FURMAN.

said container, said last named means including a plate and means for adjustably supporting the same whereby the same may be properly located to prevent the escape of the ejected sealing medium.

54. A portable mechanism of the character described including a member for conveying a sealing medium and provided with an outlet, means for forcing said medium through said outlet under pressure, means for securing said member to a container with said outlet in communication with a leak, and means associated with said member for preventing flow of said medium exteriorly of said container, said last named means including a plate, a threaded member to which said plate is pivoted, a bracket in which said threaded member is adjustably mounted, and means cooperating with said threaded member for forcing said plate against the exterior of a container and locking said plate in adjusted position.

In testimony whereof I have signed this specification.

EUGENE C. FURMAN.

CERTIFICATE OF CORRECTION.

Patent No. 1,620,154.            Granted March 8, 1927, to

EUGENE C. FURMAN.

It is hereby certified that error appears in the printed specification of the above numbered patent requiring correction as follows: Page 10, line 58, claim 3, for the word "returning" read "retaining"; and that the said Letters Patent should be read with this correction therein that the same may conform to the record of the case in the Patent Office.

Signed and sealed this 11th day of September, A. D. 1928.

(Seal)

M. J. Moore,
Acting Commissioner of Patents.

CERTIFICATE OF CORRECTION.

Patent No. 1,620,154.  Granted March 8, 1927, to

EUGENE C. FURMAN.

It is hereby certified that error appears in the printed specification of the above numbered patent requiring correction as follows: Page 10, line 58, claim 3, for the word "returning" read "retaining"; and that the said Letters Patent should be read with this correction therein that the same may conform to the record of the case in the Patent Office.

Signed and sealed this 11th day of September, A. D. 1928.

(Seal)

M. J. Moore,
Acting Commissioner of Patents.